(12) United States Patent
Fields, Jr. et al.

(10) Patent No.: US 6,539,487 B1
(45) Date of Patent: Mar. 25, 2003

(54) SYSTEM FOR DYNAMICALLY SELECTING MAXIMUM NUMBER OF ACCESSIBLE BANKS OF MEMORY PER CYCLE BY MONITORING ACTUAL POWER TO EACH OF THE BANKS TO DETERMINE THE NUMBER OF ACCESSIBLE BANKS

(75) Inventors: James Stephen Fields, Jr., Austin, TX (US); Sanjeev Ghai, Austin, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,958

(22) Filed: Nov. 9, 1999

(51) Int. Cl.$^7$ ................................................. G06F 1/26
(52) U.S. Cl. ........................ 713/340; 711/106; 365/226
(58) Field of Search ................................ 713/300, 340; 711/105, 106, 109, 156, 166; 365/189.07, 226

(56) References Cited

U.S. PATENT DOCUMENTS

| | | | | |
|---|---|---|---|---|
| 4,725,945 A | * | 2/1988 | Kronstadt et al. | 365/230.03 |
| 5,745,854 A | * | 4/1998 | Schorman | 370/348 |
| 5,751,993 A | * | 5/1998 | Ofek et al. | 710/54 |
| 5,778,446 A | * | 7/1998 | Kim | 711/105 |
| 6,167,486 A | * | 12/2000 | Lee et al. | 711/120 |
| 6,167,524 A | * | 12/2000 | Goodnow et al. | 713/300 |
| 6,185,146 B1 | * | 2/2001 | Shioyama et al. | 365/225.7 |
| 6,219,795 B1 | * | 4/2001 | Klein | 713/300 |

* cited by examiner

Primary Examiner—Thomas Lee
Assistant Examiner—Thuan Du
(74) Attorney, Agent, or Firm—Volel Emile; Bracewell & Patterson, L.L.P.

(57) ABSTRACT

A method and system for dynamically selecting accessible banks of memory per cycle within a banked cache memory. In accordance with the method and system of the present invention, the application of power to each bank of memory of a banked cache memory is monitored in order to determine a maximum number of selectable bank accesses per cycle such that power application to each of the banks of memory is not degraded. No more than the maximum number of selectable bank accesses per cycle are permitted for subsequent cycles from among the banks of memory, such that the number of accessible banks of memory of a banked cache memory is dynamically selectable to maximize bank accesses per cycle while maintaining an acceptable power application to each of the banks of memory.

27 Claims, 3 Drawing Sheets

SYSTEM FOR DYNAMICALLY SELECTING MAXIMUM NUMBER OF ACCESSIBLE BANKS OF MEMORY PER CYCLE BY MONITORING ACTUAL POWER TO EACH OF THE BANKS TO DETERMINE THE NUMBER OF ACCESSIBLE BANKS

BACKGROUND OF THE INVENTION

1. Technical Field

The present invention relates to a method and system for power management, and in particular to an improved method and system for dynamic power management of a banked cache memory. Still more particularly, the present invention relates to a method and system for dynamically selecting a maximum number of accessible banks of memory per cycle within a banked cache memory such that the number of bank accesses per cycle are maximized while maintaining an acceptable power application to each of the banks of memory of the banked cache memory.

2. Description of the Related Art

As is well known in the art, random access memories (RAM) are typically semi-conductor based memory that can be read from and written to by the central processing unit and other hardware devices. The storage locations within RAM can be accessed in any order. For example, one type of RAM which is well known in the art is a dynamic RAM (DRAM). Dynamic RAM is typically utilized for storing large increments of data.

Typically, multiple banks of DRAM are manufactured together on a board or chip. In particular, DRAMs store information in integrated circuits containing capacitors. Because capacitors lose their charge over time, DRAM chips typically include logic to refresh each DRAM bank. While a DRAM bank is being refreshed, the bank cannot be read by the processor which leads to wait states while the DRAM banks are being refreshed. Typically, a controller associated with the banked DRAM controls the flow of data to and from each bank within the banked DRAM and determines when power refreshing of each bank occurs. If more banks are being accessed for read, write or refresh during a single cycle than power is provided to refresh in a subsequent cycle, power rail collapse occurs, which degrades the performance of the banked DRAM and may cause failure of the banked DRAM. For example, each DRAM bank may require a particular power application, such as 1.5 V to operate properly. Each DRAM bank may continue to operate properly if ±10% of 1.5 V is applied, however for voltage deviations greater than 10% the performance of the bank degrades as the bank is not provided sufficient power. The controller preferably controls the maximum number of banks that are accessible during a single cycle such that power rail collapse does not occur.

According to one known method for controlling access to banks, a worst case analysis is calculated for a designed banked DRAM cache prior to manufacturing the banked DRAM cache, to determine the maximum number of banks which can be accessed during a single cycle. The worst case maximum is then fixed within the banked DRAM cache as the maximum number of accessible banks for each cycle. Performing worst case analysis adds to the design time of a banked DRAM cache before manufacture. In addition, the actual worst case maximum may increase or decrease in the manufactured product.

SUMMARY OF THE INVENTION

In view of the foregoing, it is therefore an object of the present invention to provide an improved method and system for power management within a data processing system.

It is another object of the present invention to provide an improved method and system for dynamic power management of a banked cache memory within a data processing system.

It is yet another object of the present invention to provide an improved method and system for dynamically selecting a maximum number of accessible banks of memory per cycle within a banked cache memory such that the number of bank accesses per cycle are maximized while maintaining an acceptable power application to each of the banks of memory of the banked cache memory.

In accordance with the method and system of the present invention, the application of power to each bank of memory of a banked cache memory is monitored in order to determine a maximum number of selectable bank accesses per cycle such that power application to each of the banks of memory is not degraded. No more than the maximum number of selectable bank accesses per cycle are permitted for subsequent cycles from among the banks of memory, such that the number of accessible banks of memory of a banked cache memory is dynamically selectable to maximize bank accesses per cycle while maintaining an acceptable power application to each of the banks of memory.

All objects, features and advantages of the present invention will become apparent in the following detailed written description.

DESCRIPTION OF THE DRAWINGS

The invention, itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
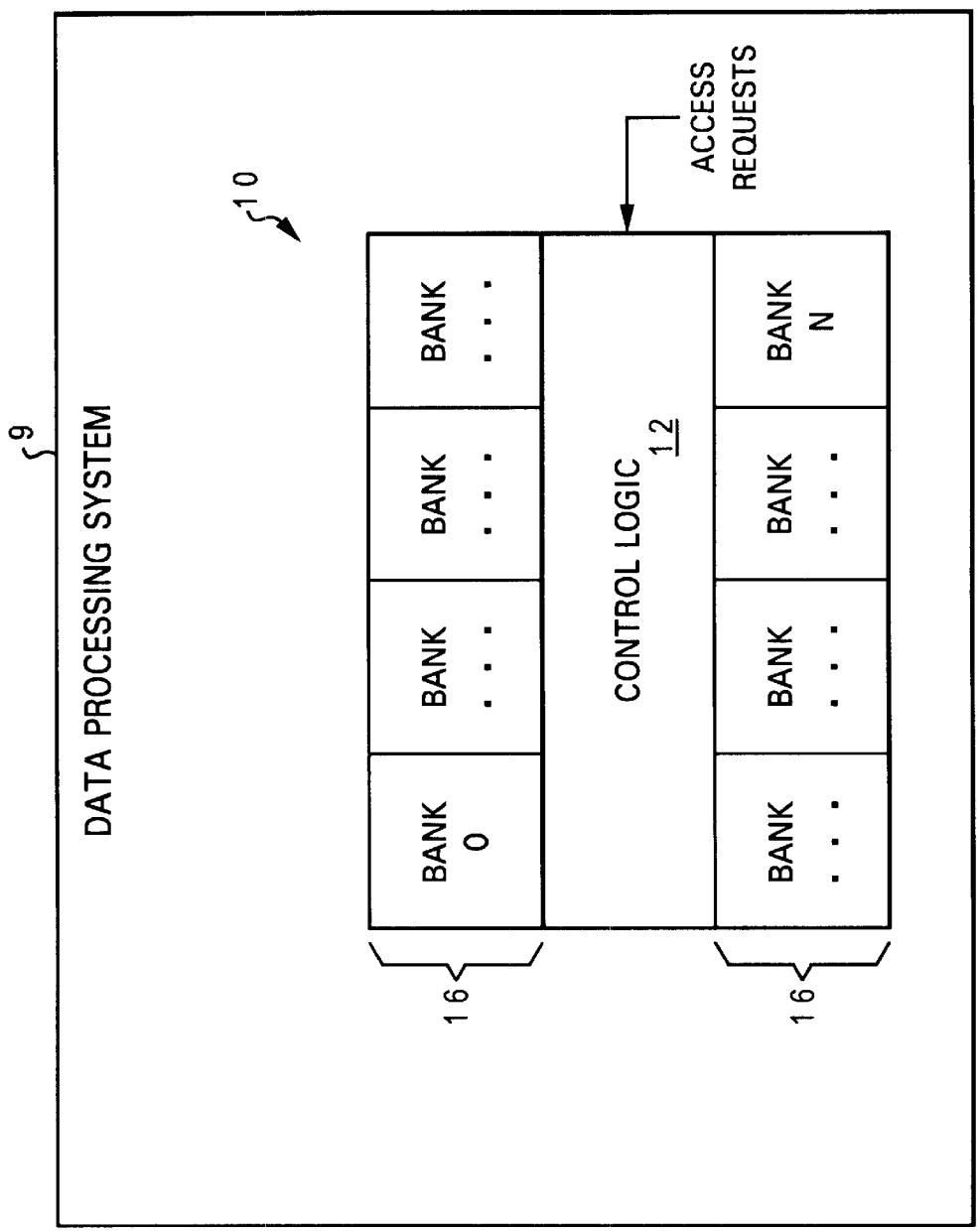
FIG. 1 depicts a high level block diagram of a banked DRAM cache and a control logic operable to control and permit access to memory locations of the banked DRAM cache.

With reference now to the figures and in particular with reference now to FIG. 1, there is depicted a high level block diagram of a banked DRAM cache and a control logic operable to control and permit access to memory locations of the banked DRAM cache within a data processing system. As illustrated, a banked DRAM cache 10 resides within a data processing system 9. Banked DRAM cache 10 includes multiple banks of memory 16 that are enumerated from 0 to N. Each of banks 16 preferably comprises rows and columns of memory locations accessible by row access signals (RAS) and column access signals (CAS), as is well known in the art.

As depicted, control logic 12 receives access requests and is operable to control and permit access to memory locations of banked DRAM cache 10. Banked DRAM cache 10 stores information in integrated circuits containing capacitors. Because capacitors lose their charge over time, DRAM cache 10 includes logic to refresh each of banks 16. While each of banks 16 is being refreshed, the bank cannot be read by the processor which leads to wait states while the banks 16 are being refreshed. As previously described, the voltage application to each bank during refresh is required to remain within a range of voltage in order for banks 16 to properly refresh. After each of banks 16 is accessed, the bank must be refreshed within the next cycle to maintain the contents of the bank memory.

Figure 2:
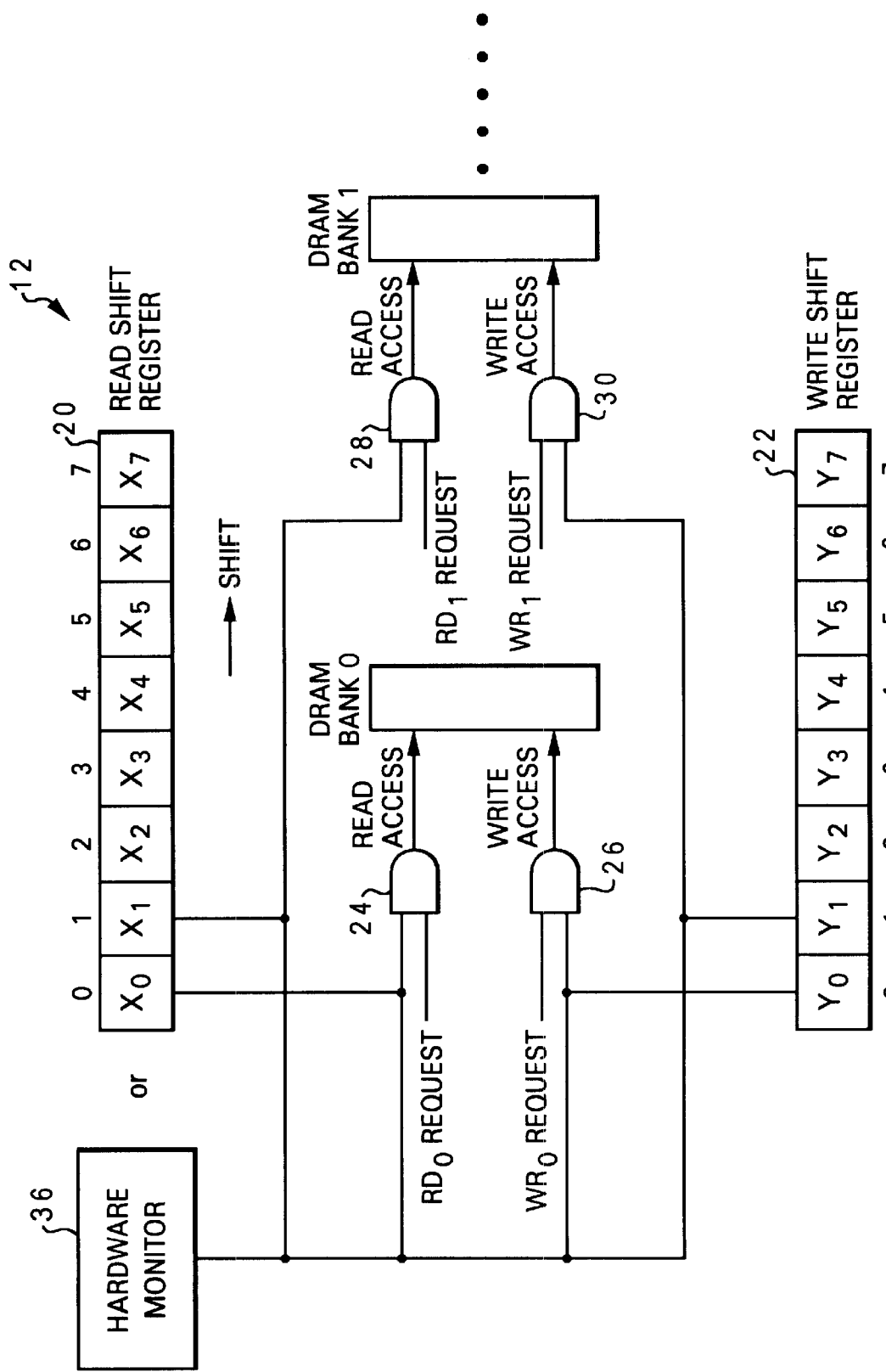
FIG. 2 illustrates a block diagram of a portion of the control logic for the banked DRAM cache.

Referring now to FIG. 2, there is illustrated a block diagram of a portion of the control logic for the banked DRAM cache. While a description of logic included for controlling bank 0 is provided, similar logic is preferably applicable for each bank within a banked DRAM cache. As depicted, a DRAM bank 0 receives read access signals and write access signals. In particular, read access signals are enabled from a control gate 24 with inputs of a control signal from read shift register 20 and a read 0 request signal. The read 0 request signal indicates whether there is an access request to read from the memory of bank 0. Similarly, read access signals are enable from a controlled gate 28 with inputs of a control signal from read shift register 20 and a read 1 request signal. The read 1 request signal indicates whether there is an access request to read from the memory bank 1. While not depicted, for each bank, read requests may be held in a queue or other storage mechanism until read access to the bank is granted. Alternatively, read requests may be passed directly to an intended bank for access.

The control signal from read shift register 20 indicates the state of the bit of 8-bit read shift register 20 which corresponds with DRAM bank 0. In the present example, the bit marked x0 corresponds with DRAM bank 0. If the read 0 request signal indicates there is an access request to read from the memory of bank 0 and the control signal for bit x0 from read shift register 20 is selected, then a read access of DRAM bank 0 is allowed.

Write accesses are enabled in a similar manner as read accesses. However, write accesses are enabled from a control gate 26 with input of a control signal from a write shift register 22 and a write 0 request signal. The write 0 request signal indicates whether there is an access request to write to the memory of bank 0. Similarly, write accesses are enabled from a control gate 30 with input of a control signal from a right shift register 22 in a write 1 request signal. The write 1 request signal indicates whether there is an access request write to the memory of bank 1. While not depicted, for each bank, write requests maybe held in a queue or other storage mechanism until write access to the bank is granted. Alternatively, write requests may be passed directly to an intended bank for access.

The control signal from write shift register 22 indicates the state of a bit of 8-bit write shift register 20 which corresponds with DRAM bank 0. In the present example, the bit marked y0 corresponds with DRAM bank 0. If the write 0 request signal indicates there is an access request to write to the memory of bank 0 and the control signal for bit y0 from write shift register 22 indicates an on state, then a write access of DRAM bank 0 is allowed.

For each cycle of access, both read shift register 20 and write shift register 22 shift control data x0–x7 and y0–y7. A particular number of bits within read shift register 20 and write shift register 22 may be selected during any given cycle. Preferably, through monitoring the power application to each bank over a range of amounts of selected bits, a maximum number of selectable bits is determinable and loaded into read shift register 20 and write shift register 22 by an external source. In particular, the maximum number of read accesses within a cycle may be different than the maximum number of write accesses within a cycle. While read shift register 20 and write shift register 22 are depicted in the present embodiment for selecting the accessible banks each cycle, in alternate embodiments, alternate types of logic control devices and/or software control may select the accessible banks each cycle.

When utilizing read shift register 20 and write shift register 22 to control the maximum number of selectable bits, it is preferable to monitor power application to each bank and then load a maximum number of selectable bits per cycle by an external source. By this embodiment, a banked DRAM memory might be tested within a lab environment and loaded with the maximum number of selectable bits. In an alternate embodiment, an internal source, such as hardware monitor 36 may monitor power application to each bank and intelligently determine and permit a maximum number of selectable banks per cycle. In this alternate embodiment, the banked DRAM cache acts to constantly monitor power application to each bank while in use and alter the maximum number of accessible banks within a cycle dependent on actual operating conditions. Multiple factors in the actual operating condition of a banked DRAM cache may effect the efficiency at which the banked DRAM cache operates. In particular, temperature may effect the efficiency at which a banked DRAM cache operates, whereby the maximum number of accesses per cycle may be increased or decreased based on the efficiency of the banked DRAM cache at a current operating temperature.

Figure 3:
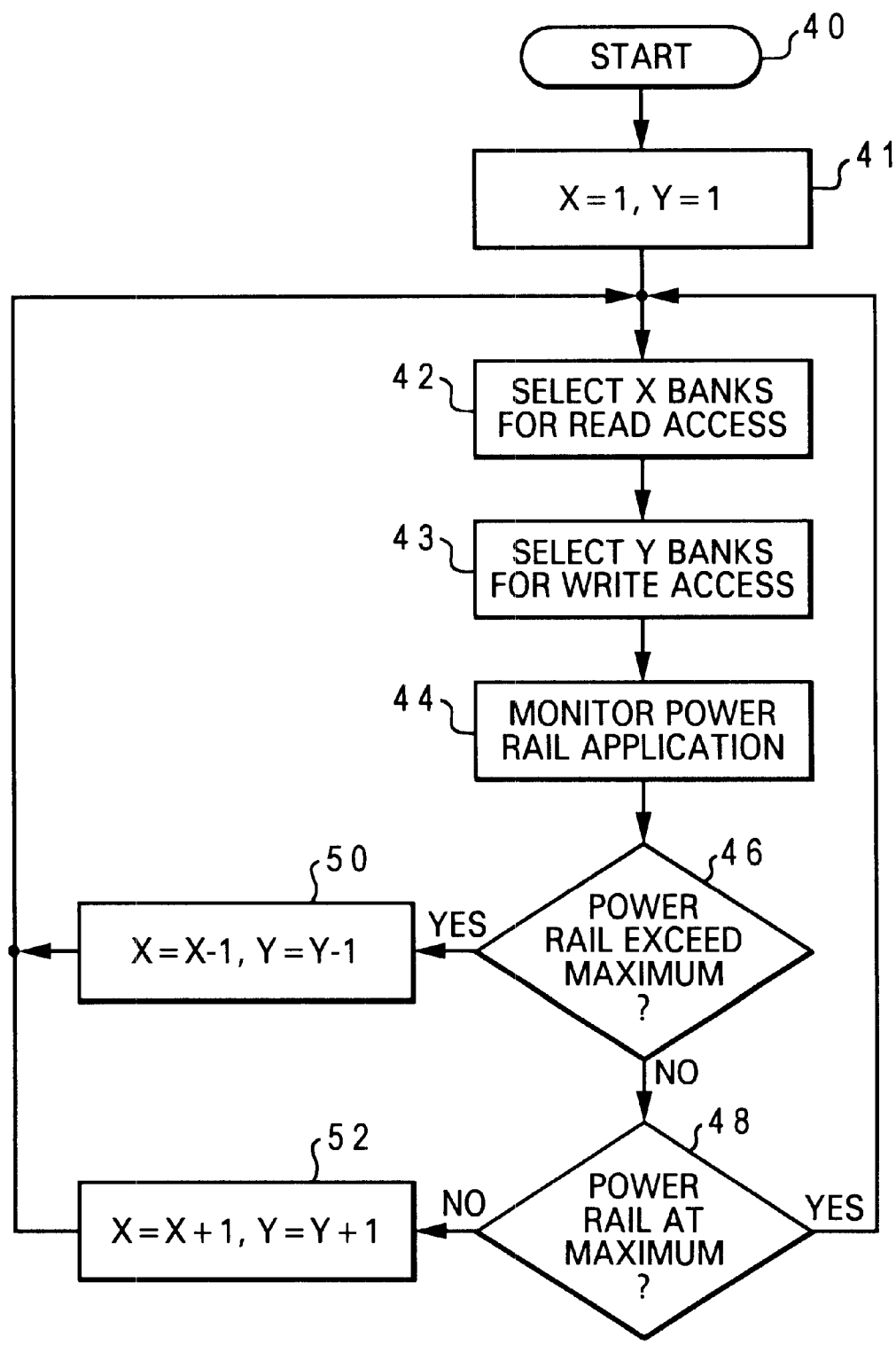
FIG. 3 depicts a high level logic flowchart of a process for monitoring the power rail of a banked DRAM cache and intelligently managing bank access.

With reference now to FIG. 3, there is depicted a high level logic flowchart of a process for monitoring the power rail of a banked DRAM cache and intelligently managing bank access. As illustrated, the process starts at block 40 and thereafter proceeds to block 41. Block 41 depicts setting X equal to "1" and Y equal to "1". In alternate embodiments, X and Y may be set to an alternate value. Thereafter, block 42 illustrates selecting X banks for read access. Next, block 43 depicts selecting Y banks for write access. In particular, in selecting X banks and Y banks for access, the process may rotate between which X banks and Y banks are selected for each cycle or may detect which banks have requests for access and place more importance on selecting those banks. In addition, in selecting X banks for read access and Y banks for write access, control signals which indicate which banks may be accessed are provided.

Block 44 depicts monitoring the power rail application of a banked cache memory. In particular, a set range between which the power rail application preferably falls is monitored. Thereafter, block 46 illustrates a determination as to whether or not the power rail exceeds a maximum range. If the power rail exceeds a maximum range, the process passes to block 50. Block 50 depicts setting X to "X−1" and Y to "Y−1" and thereafter proceeding to block 42. If the power rail does not exceed a maximum range, the process passes to block 48. Block 48 illustrates a determination as to whether or not the power rail is at the maximum range. If the power rail is not at the maximum range, the process passes to block 52. Block 52 depicts setting X to "X+1" and Y to "+1" and thereafter proceeding to block 42. If the power rail is at the maximum range, the process passes to block 42.

As depicted, the process of FIG. 3 iterates to maintain the number of selected accessible banks at a maximum for the acceptable range of power rail application. Preferably, the process of FIG. 3 is performed by a controller within a banked cache memory being controlled, such as within hardware monitor 36 of FIG. 2. However, in alternate embodiments, the process of FIG. 3 may be performed by a controller remote from the banked cache memory being controlled. A controller remote from the banked cache memory being controlled may select the X banks and Y banks utilizing read shift register 20 and write shift register 22 of FIG. 2. Moreover, the process of FIG. 3 is depicted where both the number of X banks for read accesses and Y banks for write accesses are changed together, however in alternate embodiments, the power rail application for read accesses and write accesses may be monitored separately whereby the values for X and Y may be altered independent of each other. In addition, while selecting read accesses and write accesses and monitoring the power rail application for these types of accesses is depicted, other types of accesses may also be selected and the effects of monitored by the process.

While the invention has been particularly shown and described with reference to a preferred embodiment, it will be understood by those skilled in the art that various changes in form and detail may be made therein without departing from the spirit and scope of the invention.

What is claimed is:

1. A method for dynamically selecting accessible banks of memory within a banked cache memory, said method comprising the steps of:
    monitoring power application to each of a plurality of banks of memory of a banked cache memory in order to determine a maximum number of selectable bank accesses per cycle wherein power application to each of said plurality of banks of memory is not degraded;
    permitting at most said determined maximum number of selectable bank accesses per cycle for subsequent cycles from among said plurality of banks of memory, in response to said monitoring, such that the number of accessible banks of memory of a banked cache memory is dynamically selectable to maximize bank accesses per cycle while maintaining an acceptable power application to each of a plurality of banks of memory.

2. The method for dynamically selecting accessible banks of memory according to claim 1, wherein said step of monitoring power application, further comprises the step of:
    monitoring said power application by a controller embedded with said banked cache memory.

3. The method for dynamically selecting accessible banks of memory according to claim 1, wherein said step of monitoring power application further comprises the step of:
    monitoring said power application by a controller remote from said banked cache memory.

4. The method for dynamically selecting accessible banks of memory according to claim 1, wherein said step of monitoring power application further comprises the steps of:
    comparing said monitored power application with a power threshold range;
    reducing said maximum number of selectable bank accesses per cycle, in response to determining from said comparison that said monitored power application exceeds said power threshold range;
    maintaining said maximum number of selectable bank accesses per cycle, in response to determining from said comparison that said monitored power application is at the maximum of said power threshold range; and
    increasing said maximum number of selectable banks accesses per cycle, in response to determining that said monitored power application is less than said power threshold range.

5. The method for dynamically selecting accessible banks of memory according to claim 1, wherein said step of monitoring power application further comprises the steps of:
    monitoring power application to said plurality of banks of memory of a banked cache memory for a maximum number of selectable bank accesses per cycle for read requests; and
    monitoring power application to said plurality of banks of memory of a banked cache memory for a maximum number of selectable bank accesses per cycle for write requests.

6. The method for dynamically selecting accessible banks of memory according to claim 1, wherein said method further comprises the step of:
    providing control signals for a selected set of said plurality of banks of memory equal to said maximum number of selectable bank accesses per cycle, wherein said control signals indicate accessibility to said selected banks.

7. The method for dynamically selecting accessible banks of memory according to claim 6, wherein said method further comprises the step of:
    providing control signals that indicate a type of access request that is accessible to each of said selected banks.

8. The method for dynamically selecting accessible banks of memory according to claim 1, wherein said method further comprises the step of:
    granting access requests to only said maximum number of accessible banks of memory per cycle.

9. The method for dynamically selecting accessible banks of memory according to claim 1, wherein said method further comprises the step of:
    deferring access requests which exceed said maximum number of selectable access per cycle.

10. A system for dynamically selecting accessible banks of memory per cycle within a banked cache memory, said system comprising:
    means for monitoring power application to each of a plurality of banks of memory of a banked cache memory in order to determine a maximum number of selectable bank accesses per cycle wherein power application to each of said plurality of banks of memory is not degraded;
    means for permitting at most said determined maximum number of selectable bank accesses per cycle for subsequent cycles from among said plurality of banks of memory, in response to said monitoring.

11. The system for dynamically selecting accessible banks of memory according to claim 10, wherein said means for monitoring power application further comprises:
    means for monitoring said power application by a controller embedded with said banked cache memory.

12. The system for dynamically selecting accessible banks of memory according to claim 10, wherein said means for monitoring power application further comprises:
    means for monitoring said power application by a controller remote from said banked cache memory.

13. The system for dynamically selecting accessible banks of memory according to claim 10, wherein said means for monitoring power application further comprises:
    means for comparing said monitored power application with a power threshold range;
    means for reducing said maximum number of selectable bank accesses per cycle, in response to determining from said comparison that said monitored power application exceeds said power threshold range;
    means for maintaining said maximum number of selectable bank accesses per cycle, in response to determining from said comparison that said monitored power application is at the maximum of said power threshold range; and
    means for increasing said maximum number of selectable bank accesses per cycle, in response to determining that said monitored power application is less than said power threshold range.

14. The system for dynamically selecting accessible banks of memory according to claim 10, wherein said means for monitoring power application further comprises:

means for monitoring power application to a plurality of banks of memory of a banked cache memory for a maximum number of selectable banks accesses per cycle for read requests; and means for monitoring power application to a plurality of banks of memory of a banked cache memory for a maximum number of selectable bank accesses per cycle for write requests.

15. The system for dynamically selecting accessible banks of memory according to claim 10, wherein said system further comprises:

means for providing control signals to said maximum number of selectable bank accesses per cycle selected from among said plurality of banks of memory, wherein said control signals indicate accessibility to said selected banks.

16. The system for dynamically selecting accessible banks of memory according to claim 15, wherein said system further comprises:

means for providing control signals that indicate a type of access request that is accessible to each of said selected banks.

17. The system for dynamically selecting accessible banks of memory according to claim 10, wherein said system further comprises:

means for granting access requests to only said maximum number of selectable bank accesses per cycle.

18. The system for dynamically selecting a maximum number of accessible banks of memory according to claim 10, wherein said system further comprises:

means for deferring access requests which exceed said maximum number of selectable bank accesses per cycle.

19. A banked cache memory, said memory comprising:

a plurality of banks of memory;

a power element that applies power to each of said plurality of banks of memory for refreshing said plurality of banks of memory;

a selection element that selects a maximum number of accessible banks of memory for any cycle from among said plurality of banks of memory;

a pipeline element that holds access requests to said plurality of banks of memory which are being refreshed for any cycle.

20. The banked cache memory according to claim 19 further comprising:

a monitoring element that monitors the power application to said plurality of banks of memory for a maximum number of accessible banks of memory per cycle; and a comparison element that compares said monitored power application with a power threshold range, wherein degradation of said plurality of banks occurs if said monitored power application is not within said power threshold range.

21. The banked cache memory according to claim 20, wherein said monitoring element is embedded with said banked cache memory.

22. The banked cache memory according to claim 20, wherein said monitoring element is remote from said banked cache memory.

23. The banked cache memory according to claim 20, wherein said selection element further comprises:

means for reducing said maximum number of accessible banks of memory per cycle, in response to determining from said comparison element that said monitored power application exceeds said power threshold range;

means for maintaining said maximum number of accessible banks of memory per cycle, in response to determining from said comparison element that said monitored power application is at the maximum of said power threshold range; and means for increasing said maximum number of accessible banks of memory per cycle, in response to determining from said comparison element that said monitored power application is less than the maximum of said power threshold range.

24. The banked cache memory according to claim 20, wherein said monitoring element monitors a maximum number of accessible banks of memory for each of a plurality of types of requests per cycle.

25. The banked cache memory according to claim 19, wherein said selection element comprises a shift register for shifting a maximum number of accessible banks of memory per cycle, wherein for a given cycle each bit of said shift register indicates a selection of a bank of memory from among said plurality of banks of memory.

26. The banked cache memory according to claim 25, wherein said selection element comprises a first shift register for shifting a maximum number of accessible banks of memory for read requests per cycle and a second shift register for shifting a maximum number of accessible banks of memory for write requests per cycle.

27. The banked cache memory according to claim 19, wherein said selection element provides control signals to each of said selected banks indicating which type of a plurality of types of requests can be processed for that cycle at each of said selected banks.

* * * * *